UNITED STATES PATENT OFFICE.

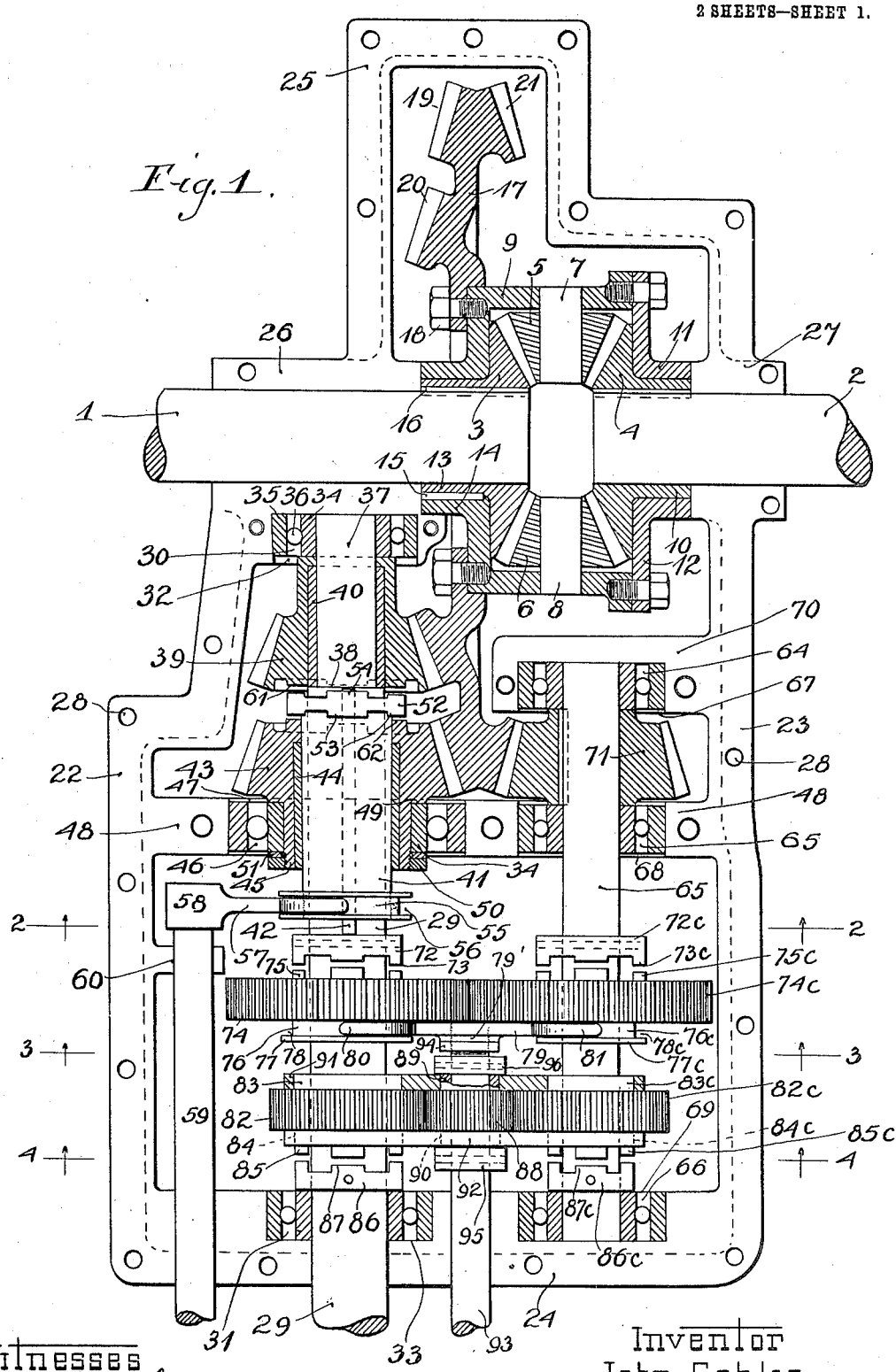

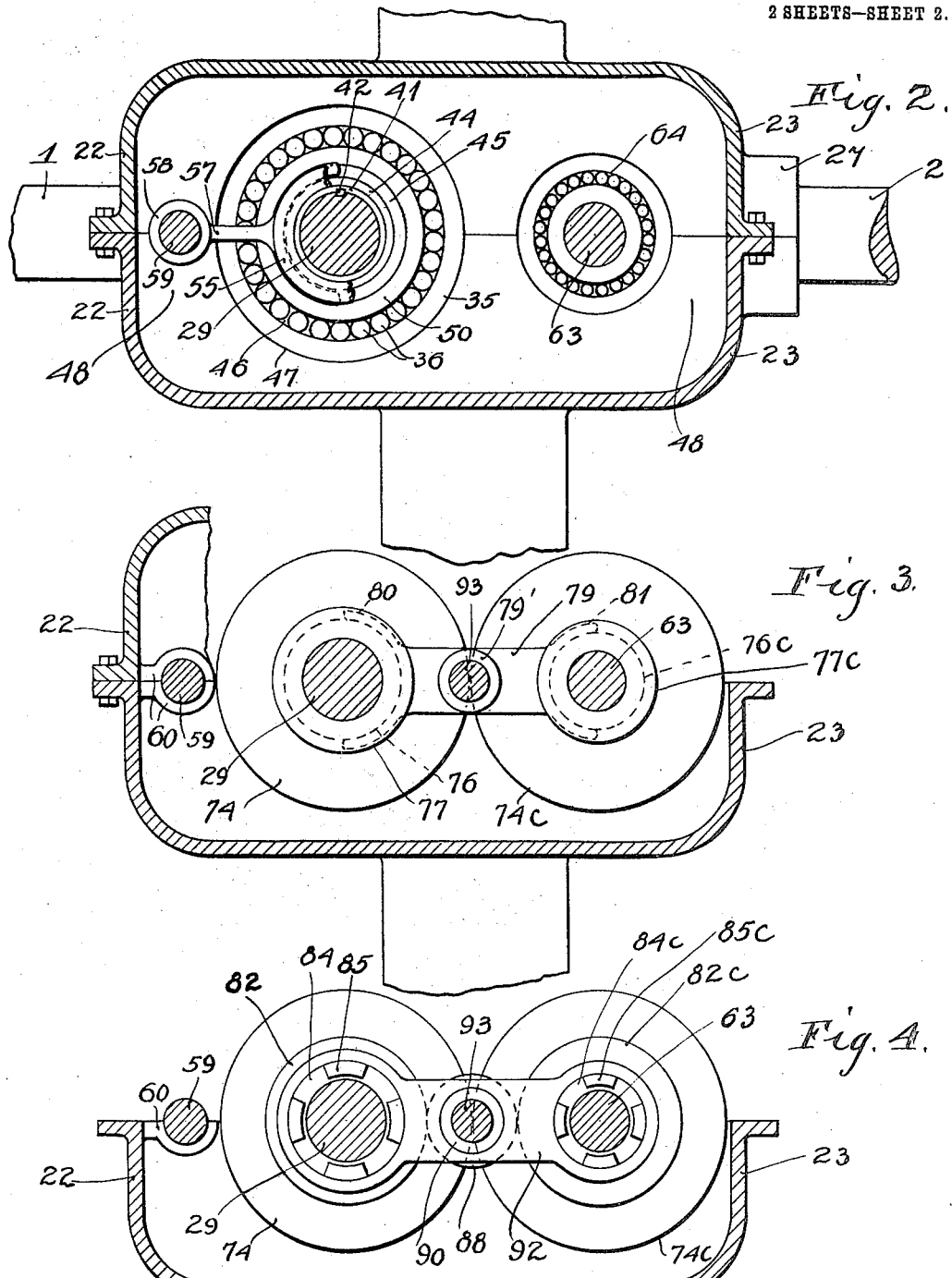

JOHN SCHLIG, OF CHICAGO, ILLINOIS.

TRANSMISSION SYSTEM.

957,263.   Specification of Letters Patent.   Patented May 10, 1910.

Application filed January 10, 1908. Serial No. 410,157.

*To all whom it may concern:*

Be it known that I, JOHN SCHLIG, a citizen of the United States, residing at Chicago, in the county of Cook and State of Illinois, have invented a certain new and useful Improvement in Transmission Systems; of which the following is a full, clear, concise, and exact description, reference being had to the accompanying drawings, forming a part of this specification.

My invention relates to transmission gearing and is adapted particularly for transmitting power from the engine of a vehicle, such as an automobile, to the axle or driving wheels.

The object of the invention is to produce simplicity of construction, compactness and a reduction in size, besides greatly increasing the efficiency of power, operation and control.

The transmission system comprises a main gear mounted on the axle and driving gears and gearing mechanism arranged to cause forward direction at three different speeds, and reverse direction at a slow speed. These various driving gears and gearing mechanism being compactly arranged, enable me to greatly reduce the diameter of the main gear and therefore to increase the clearance between the main gear and the roadway over which the vehicle travels. The driving gears and the main gear are always in mesh and the driving gears can be independently connected with the main gear through improved clutch mechanisms which are provided with substantially heavy teeth so arranged that clutching or coupling of the various gear members is quickly accomplished with certainty and without shock.

The various details of my invention will be clearly shown on the accompanying drawings, in which—

Figure 1 is a plan view of a transmission system with the top half of the inclosing casing removed and parts of the gears and bearing mechanisms being in horizontal diametrical section; Fig. 2 is a sectional view taken on line 2—2, Fig. 1; Fig. 3 is a sectional view taken on line 3—3, Fig. 1; and Fig. 4 is a sectional view taken on line 4—4, Fig. 1.

The transmission system is shown as applied to a driving axle comprising the two parts 1 and 2, each connected with a driving wheel and terminating at their inner ends, respectively, in beveled gears 3 and 4 of the differential mechanism, of which the beveled pinions 5 and 6 engaging with the beveled gears are pivoted to shafts 7 and 8 extending from the differential housing body 9, as shown. The beveled gear 4 has the hub 10 and is surrounded by hub 11 of the differential housing detachable end 12. The hub 13 of gear 3 is surrounded by the hub 14 of the differential case 9, the differential case being secured to axle section 1 through key 15, hub 13 and key 16. The main gear 17 is secured to the differential case as by means of cap bolts 18 passing through the web of the main gear and threading into the differential casing, as shown. The main gear is thus directly secured to axle section 1 and its rotation is transmitted to the axle section 2 through the differential gear mechanism. The main gear has the outer beveled gearing surface 19 and the inner beveled gearing surface 20 on its left face, and the beveled gearing surface 21 on its right face. The inclosing case for the entire transmission system comprises the main side walls 22, 23, the front wall 24 and the rear wall 25. The frame is enlarged to form bearing boxes 26 and 27 for journaling, respectively, the axle sections 1 and 2. The closing frame is also in two similar halves, the lower half only being shown in Fig. 1, these halves being bolted together through bolt holes 28. The case can be filled with oil, as is done at the present time in transmission systems of this class.

The main driving shaft 29 is shown in the same plane with the axle and at right angles thereto and is supported in ball bearings 30 and 31 supported in pockets 32 and 33 formed, respectively, in the bearing box part 26 and adjacent the front wall 24. The ball bearings may be of any construction, but are here shown as each comprising an inner cylindrical ring 34, an outer and concentric ring 35 and the interposed balls 36. The rear end 37 of the main shaft is of reduced diameter and between the shoulder 38 and the ball bearing 30 is rotatably mounted the high speed driving pinion 39, a bushing 40 being interposed between the pinion and the shaft. This pinion remains always in mesh with the inner beveled gear face 20 of the main gear and is confined between the shoulder 38 and the rear bearing 30.

Mounted on the main shaft in front of the pinion 39 is a clutch sleeve 41. This sleeve, by means of a key 42, is forced to rotate with the main shaft but is adapted for longitudinal reciprocation thereon. Surrounding this sleeve is the intermediate speed forward driving pinion 43 which is always in mesh with the outer gearing surface 19 of the main gear. This driving pinion is lined by a bushing 44 and a sleeve or hub part 45 extending from the pinion engages the ball bearing 46 supported in the pocket 47 formed in the web halves 48 extending inwardly and cast integral with the inclosing casing halves. The inner ring 34 of ball bearing 46 is clamped to the sleeve part 45 between the shoulder 49 and nut 50, a washer 51 intervening. At the rear end of the sleeve 41 is a clutch collar 52 having at its front end the clutch teeth 53 and on its rear face clutch teeth 54. At the front end of the sleeve is the collar 55 having the groove 56, this collar having threaded engagement with the front end of the sleeve 45. The ends of a clutch fork 57 engage in the groove 56, the fork extending from a head 58 secured to the end of a clutch rod 59 which bears in a guide lug 60 and which passes through the front wall 24 of the inclosing case to be connected with suitable lever mechanism which it is not necessary to show.

Normally the clutch collar 52 is in neutral position between the driving pinions 39 and 43. When the clutch rod 59 is moved to slide the sleeve 41 rearwardly, the teeth on the clutch collar will engage with clutch teeth 61 extending forwardly from the driving gear 39, and when the clutch rod is moved to slide the sleeve 41 forwardly, the clutch teeth 59 on the clutch collar will engage with clutch teeth 62 extending rearwardly from the driving pinion 43. The rotation of the main shaft is transmitted through key 42, sleeve 41 and clutch collar 52 to the driving pinion with which the clutch collar is engaging and the main gear will be driven, the other driving gear then rotating idly. This arrangement and construction of the forward driving pinions and the clutch mechanism is very compact. The groove collar 55 for engagement with the clutch rod is in front of the driving pinions in a position where more space is available and therefore the cutch collar 52 between the pinions can be made very much narrower to allow the pinions to be brought very close together and very close to the axle, thus allowing considerable reduction in the diameter of the main gear and increased clearance between the main gear and the roadway. The pinion 39 is confined between the end bearing 30 and the shoulder 38 on the shaft, and the pinion 43 is confined in its plane of rotation by being secured in the bearing 46, the bearing forming the main support for the pinion 43 and also a system to hold the shaft rigid and in alinement.

These driving pinions therefore are always maintained in the most efficient gearing relation with the main gear and with the least friction, the ball bearings taking up most of the strain and weight.

To the right of the main shaft is the countershaft 63 which is supported in ball bearings 64, 65 and 66 supported, respectively, in pockets 67, 68 and 69, the pocket 67 being formed in the web halves 70 extending from the inclosing case halves, the pocket 68 being adjacent the pocket 47 and formed in web 48, and pocket 69 being formed in the front wall 24 adjacent the pocket 33 for the main shaft. Keyed to the countershaft and confined between the ball bearings 64 and 65 is the third pinion 71 which is always in meshing relation with the gearing surface 21 on the main gear. Rigidly secured to the main shaft directly in front of the groove collar 55 is a clutch collar 72 having forwardly extending clutch teeth 73. Directly opposite this clutch collar and rigidly secured to the countershaft is the clutch collar 72ᶜ having forwardly extending clutch teeth 73ᶜ. Pivotally mounted on the main shaft in front of the clutch collar 72 is a gear wheel 74 having at its rear end clutch teeth 75 opposite the clutch teeth 73. The hub 76 extends forwardly from the gear and terminates in a flange 77 to form a groove 78. Directly opposite this gear wheel a gear wheel 74ᶜ is pivoted on the countershaft and has teeth 75ᶜ, the hub 76ᶜ, flange 77ᶜ and groove 78ᶜ. Between the hubs 78 and 78ᶜ is a frame 79 having a forked end 80 engaging in groove 78, and a forked end 81 engaging in groove 78ᶜ. On the main shaft in front of gear wheel 74 is rotatably pivoted another gear wheel 82 having the hub part 83 extending rearwardly therefrom and the hub part 84 extending forwardly therefrom, and clutch teeth 85 extending forwardly from this hub part 84, while on the main shaft in front of these teeth and adjacent the front bearing 33 is rigidly secured the clutch collar 86 having the rearwardly extending clutch teeth 87. In the same way a gear wheel 82ᶜ is pivoted on the countershaft and has the rear hub section 83ᶜ and the front hub section 84ᶜ from which extend teeth 85ᶜ, a clutch collar 86ᶜ being rigidly secured to the countershaft adjacent the end bearing 66 and having the clutch teeth 87ᶜ. Arranged between the gears 82 and 82ᶜ is an idler pinion 88 having the rear hub section 89 and the forward hub section 90. A rear plate 91 has three openings for receiving the hubs 83, 89 and 83ᶜ, while a front plate 92 has openings for receiving the hubs 84, 90 and 84ᶜ. Passing through the idler pinion 88 and forming a bearing therefor is a rod 93 whose end screw-threads into the frame 79 which is at this point reinforced by a lug 79'. A lock nut 94 engages the rod 93 and the lug 79' to lock the frame 79 to the rod. On the rod in front of the front plate 92 is pinned a collar 95 and to the rear of the rear plate 91 a collar 96 is pinned to the rod 93, these collars confining between them the hub sections of the pinion and also locking the plates to the hub sections of the pinion and the gears. The rod 93 extends forwardly through the front wall 24 of the inclosing casing, and longitudinal movement of this rod will be communicated to the plates 91 and 92 and the frame 79, therefore causing simultaneous bodily movement of the gears 74, 74$^c$, 82, 82$^c$ and the idler pinion 88.

In the normal position of the rod the gears will be in an intermediate position between the collars 72, 72$^c$, and the collars 86, 86$^c$. If the rod 93 is moved rearwardly the teeth 75 and 75$^c$ will engage, respectively, with the clutch teeth of the clutch collars 72, 72$^c$. Consequent rotation of the main driving shaft will be transmitted through collar 72, teeth 73, teeth 75, gear 74 to cause rotation of said gear, which rotation is transmitted to the gear 74$^c$ and through teeth 75$^c$, clutch teeth 73$^c$, clutch collar 72$^c$ and to the countershaft, and the third driving pinion 71 being keyed to this countershaft, rotation of the main gear will result in a forward direction. If the rod 93 were pulled forwardly then the teeth of clutch collars 86 and 86$^c$ will be engaged by teeth 85 and 85$^c$ extending from gears 82 and 82$^c$, and rotation of the main driving shaft will be transmitted through clutch collar 86 to gear 82, idler pinion 88, gear 82$^c$, teeth 85$^c$, clutch collar 86$^c$ to the countershaft, and to the main gear to cause reverse rotation thereof and at a slow speed. Gears 74 and 74$^c$ are shown as having the same diameter, and pinion 71 is smaller than pinion 43 and will cause slower speed of the main gear, pinion 39 then causing full forward speed, pinion 43 causing intermediate forward speed and pinion 71 causing slow forward speed when gears 74, 74$^c$ are clutched in, while when the gear train 88 and 82$^c$ is clutched in the pinion 71 will cause reverse rotation of the main gear at a slow speed. The gears 74 and 74$^c$ can, of course, be of different diameter so that the forward speed of pinion 71 can be adjusted, and the gearing ratios of gears 82 and 82$^c$ and pinion 88 can also be varied to adjust for different speeds of reverse rotation of the pinion 71. The structure moved by the rod 93 is perfectly balanced on the main shaft and countershaft and can, therefore, be readily controlled. The arrangement of passing the rod 93 through the idler pinion allows the forward and reverse gearing train to be brought very close together, and the entire structure is very compact and needs very little space.

The transmission system described above is very simple, compact and very efficient. The gears are always in mesh and all clutching is between clutch teeth, which can be made of any size and strength and which can be brought together into clutching engagement almost instantly, with very little power. The ball bearings provided for the various shafts and driving pinions take up the greater part of the strains, and thus the friction and the wear and tear is reduced to a minimum. After the inclosing case halves are secured firmly together, the casing can be filled with oil and all the bearing surfaces will be constantly thoroughly lubricated. These parts are also so arranged that dissembling and assembling can be very readily and quickly accomplished.

I desire to secure the following claims by United States Letters Patent:

1. In a transmission system, the combination of an axle to be driven, a main gear on said axle having gearing surfaces, a main shaft, driving pinions on said main shaft meshing with gearing surfaces on the main gear, means for independently connecting any one of said driving pinions with the driving shaft, an additional driving pinion always meshing with another gearing surface on the main gear, a counter shaft supporting said additional pinion, gearing mechanism on said driving shaft, gearing mechanism on said counter shaft, and clutch mechanism associated with said gearing mechanisms for connecting said main shaft with the counter shaft to cause either forward or reverse rotation of the counter shaft and of the additional pinion to thereby cause either forward or reverse rotation of the main gear.

2. In a transmission system of the class described, the combination of an axle to be driven, a main gear on said axle having gearing surfaces, a driving shaft at right angles to the axle and rotating always in one direction, forward driving pinions mounted on said driving shaft and always meshing with gearing surfaces on the main gear, clutch mechanism for independently causing connection of any one of the forward driving pinions with the driving shaft, a counter shaft, a driving pinion on said counter shaft always meshing with another gearing surface on the main gear, gearing mechanism normally idly mounted on the driving shaft and counter shaft, additional gearing mechanism also normally idly mounted on the driving and counter shafts, and clutch mechanism for connecting either one of said gearing mechanisms with the driving and counter shafts to cause either forward or reverse rotation of the counter shaft and the driving pinion thereon.

3. In a system of transmission, the combination of an axle to be driven, a main gear on said axle, a driving shaft, a counter shaft, a driving pinion on said counter shaft always meshing with the main gear, a set of gears always in mesh with each other, one gear of the set being on the driving shaft and the other gear on the counter shaft, clutch mechanism, and means for bodily moving the set of gears to cause the clutch mechanism to connect the gears of the set with the driving shaft and with the counter shaft whereby rotation is transmitted from the driving shaft to the counter shaft and the driving pinion and main gear.

4. In a transmission system of the class described, the combination of an axle to be driven, a main gear on said axle, a driving shaft, a secondary shaft, a driving pinion on said secondary shaft for engaging the main gear, a gear wheel on the drive shaft, a gear wheel on the secondary shaft, said gears always meshing, clutching mechanism, and means for bodily moving the gear wheels to render the clutch mechanism effective to connect the counter shaft in driving relation with the main shaft whereby the driving pinion will drive the main gear.

5. In a system of transmission of the class described, the combination of an axle to be driven, a main gear on said axle, a driving shaft at right angles to the axle, a counter shaft, a driving pinion on said counter shaft engaging the main gear, a gear wheel normally idly mounted on the drive shaft, a companion gear wheel normally idly mounted on the counter shaft, said gear wheels always meshing and each having clutch teeth, a clutch collar secured to each of the shafts, and means for bodily moving the gear wheels to carry their clutch teeth into engagement with the clutch collars whereby rotation is transmitted from the driving shaft to the counter shaft and to the driving pinion and main gear.

6. In a transmission system of the class described, the combination of an axle to be driven, a main gear on said axle, a driving shaft, a counter shaft, a driving pinion on the counter shaft engaging the main gear, a gear wheel on the driving shaft, a companion gear wheel on the counter shaft, said gears always meshing, clutch members on each gear wheel, companion clutch members secured to each shaft, and a movable frame for bodily moving the gear wheels to engage the clutch members whereby rotation is transmitted from the driving shaft to the counter shaft and to the driving pinion and main gear.

7. In a transmission system of the class described, the combination of an axle to be driven, a main gear on said axle, a driving shaft, a counter shaft, a driving pinion on said counter shaft engaging the main gear, a gear wheel associated with the driving shaft, a companion gear wheel associated with the counter shaft, said gear wheels always meshing, clutch mechanism for the driving shaft and associated gear wheel, clutch mechanism for the counter shaft and associated gear wheel, and means for actuating the clutch mechanisms to connect the one gear wheel in driving relation with the drive shaft and the other gear wheel in driving relation with the counter shaft, whereby rotation of the driving shaft is transmitted to the counter shaft and to the driving pinion and main gear.

8. In a system of transmission of the class described, the combination of an axle to be driven, a main gear on said axle, a driving shaft, a counter shaft, a driving pinion on the counter shaft engaging the main gear, a gear wheel on the driving shaft, a gear wheel on the counter shaft, said gears always meshing, a second gear wheel on the driving shaft, a second gear wheel on the counter shaft, an idler gear wheel interposed between said second gear wheels and always in mesh therewith, clutch mechanism, a second clutch mechanism, a movable frame connected with all the gear wheels, said frame when moved in one direction causing one of the clutch mechanisms to become effective to connect the first gear wheels into driving relation with their respective shafts to cause transmission of rotation from the drive shaft to the counter shaft and rotation of the driving pinion in one direction, and movement in the other direction of the frame causing the second clutch mechanism to connect the second gear wheels into driving relation with their respective shafts whereby rotation is transmitted from the drive shaft to the counter shaft to cause reverse direction of rotation of the driving pinion.

9. In a transmission system of the class described, the combination of an axle to be driven, a main gear on said axle, a driving shaft, a counter shaft, a driving pinion on the counter shaft engaging the main gear, a train of gear wheels for connecting the drive shaft with the counter shaft, a second train of gear wheels for connecting the drive shaft with the counter shaft, clutch mechanism for the first train of gears, clutch mechanism for the second train of gears, and means adapted to cause bodily movement of the first train of gears to render the corresponding clutch mechanism effective to connect the train of gears with the shafts to cause rotation to be transmitted from the drive shaft to the counter shaft and rotation of the counter shaft and driving gear in one direction, said means being also adapted to cause bodily movement of the second train of gears to render the corresponding clutch mechanism effective to connect the second train of gears with the shafts to cause rotation to be transmitted from the drive shaft to the counter shaft and rotation of the counter shaft and driving pinion in reverse direction.

10. In a system of transmission, the combination of an axle to be driven, a main gear on said axle, a drive shaft, a counter shaft, a driving pinion on the counter shaft engaging the main gear, a train of gear wheels, one of the gear wheels being on the drive shaft and the other gear wheel on the counter shaft, a second train of gear wheels, one of the gear wheels of the second train being on the drive shaft and another of the gears of the second train being on the counter shaft, a frame connected with all the gear wheels and movable so that the gear wheels can be carried into different parallel planes, clutch members on each of the gear wheels of the shafts, and companion clutch members on the shafts, movement of the frame in one direction causing the clutch members of the one train of gear wheels to connect with the companion clutch members on the shafts whereby rotation is transmitted from the drive shaft to the counter shaft through the first train of gears and to the driving pinion in one direction, and movement of the train in the opposite direction causing connection of the clutch members of the second train of gear wheels with the companion clutch members on the shafts whereby rotation is transmitted from the drive shaft to the counter shaft to cause rotation of the counter shaft and driving pinion in the opposite direction.

11. In a system of transmission of the class described, the combination of an axle to be driven, a main gear on said axle, a drive shaft, a counter shaft, a driving pinion on the counter shaft engaging the main gear, a gear wheel on the drive shaft having clutch teeth and a grooved collar, a companion clutch member on the drive shaft having clutch teeth, a second gear wheel on the counter shaft having clutch teeth and a grooved collar, a companion clutch member on the counter shaft having clutch teeth, a forked frame engaging both grooved collars, said frame being movable to cause bodily movement of the gear wheels to connect their clutch teeth with the clutch teeth of the companion clutch members on the shaft, whereby said gear wheels are connected in driving relation with the shaft and rotation transmitted from the drive shaft to the counter shaft and the driving pinion.

12. In a transmission system of the class described, the combination of an axle to be driven, a main gear on said axle, a driving shaft, a counter shaft, a driving pinion on said counter shaft engaging the main gear, a pair of clutch members on the drive shaft, a corresponding pair of clutch members on the counter shaft, forward and reverse gearing transmission mechanism engaging with the shafts between the clutch members thereon, companion clutch members for the transmission mechanism, and means for causing bodily movement of the transmission mechanism in one direction to cause connection of the clutch members and the transmission mechanism with the shafts to cause transmission of rotation from the driving shaft to the counter shaft in one direction, and for causing bodily movement of the transmission mechanism in the opposite direction to connect the clutch members to cause connection of the transmission mechanism with the shafts and transmission of rotation from the drive shaft to the counter shaft in reverse direction.

13. In a system of transmission of the class described, the combination of an axle to be driven, a main gear on said axle, a driving shaft, a counter shaft, a driving pinion on the counter shaft engaging the main gear, a pair of clutch members mounted on the drive shaft, a corresponding pair of clutch members mounted on the counter shaft, a train of gear wheels, one of said gear wheels being mounted on the drive shaft, and the other gear wheel being mounted on the counter shaft, a second train of gear wheels, one of the gear wheels of the second train being mounted on the drive shaft and another gear wheel being mounted on the counter shaft, a frame connecting with all the gear wheels and adapted to be moved to slide the gear wheels along the shafts and between the clutch members thereon, clutch mechanism for the first train of gears, clutch mechanism for the second train of gears, movement of the frame in one direction causing connection of the clutch mechanisms of the first train of gears with the adjacent clutch members on the shafts whereby the first train of gears is connected in driving relation with the shafts and rotation transmitted from the driving shaft to the counter shaft and driving pinion, and movement of the frame in the opposite direction causing connection of the clutch mechanisms for the second train of gears with the adjacent clutch members on the shafts to connect the second train of gears in driving relation with the shafts to cause transmission of rotation from the drive shaft to the counter shaft and to the driving pinion in reverse direction.

In witness whereof, I hereunto subscribe my name this 7th day of January A. D., 1908.

JOHN SCHLIG.

Witnesses:
CHARLES J. SCHMIDT,
FRED W. KOEHN.